United States Patent
Emge et al.

(10) Patent No.: US 12,037,445 B2
(45) Date of Patent: Jul. 16, 2024

(54) POLYURETHANE-BASED POLYMER MATERIAL HAVING EXCELLENT RESISTANCE TO HEAT DISTORTION AND ELONGATION AT TEAR

(71) Applicant: BASF SE, Ludwigshafen am Rhein (DE)

(72) Inventors: Andreas Emge, Lemfoerde (DE); Andre Meyer, Lemfoerde (DE); Berend Eling, Lemfoerde (DE); Stefan Auffarth, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/971,987

(22) PCT Filed: Feb. 11, 2019

(86) PCT No.: PCT/EP2019/053234
§ 371 (c)(1),
(2) Date: Aug. 21, 2020

(87) PCT Pub. No.: WO2019/162115
PCT Pub. Date: Aug. 29, 2019

(65) Prior Publication Data
US 2020/0399418 A1    Dec. 24, 2020

(30) Foreign Application Priority Data
Feb. 22, 2018 (EP) .................................. 18158170

(51) Int. Cl.
| | | |
|---|---|---|
| C08F 283/00 | (2006.01) | |
| C08G 18/08 | (2006.01) | |
| C08G 18/12 | (2006.01) | |
| C08G 18/22 | (2006.01) | |
| C08G 18/32 | (2006.01) | |
| C08G 18/36 | (2006.01) | |
| C08G 18/48 | (2006.01) | |
| C08G 18/66 | (2006.01) | |
| C08G 18/72 | (2006.01) | |
| C08G 18/76 | (2006.01) | |
| C08G 18/79 | (2006.01) | |
| C08K 9/06 | (2006.01) | |

(52) U.S. Cl.
CPC ......... *C08G 18/7664* (2013.01); *C08G 18/36* (2013.01); *C08G 18/4816* (2013.01); *C08G 18/4829* (2013.01); *C08G 18/6696* (2013.01); *C08G 18/725* (2013.01)

(58) Field of Classification Search
None
See application file for complete search history.

(56) References Cited

U.S. PATENT DOCUMENTS

| | | | | |
|---|---|---|---|---|
| 4,366,301 A | * | 12/1982 | Le Roy | ................ C08G 18/675 |
| | | | | 156/330.9 |
| 6,136,883 A | | 10/2000 | Yang et al. | |
| 2005/0027090 A1 | * | 2/2005 | Zhu | ..................... C09D 175/16 |
| | | | | 528/44 |
| 2007/0173628 A1 | | 7/2007 | Ruppel et al. | |
| 2007/0219282 A1 | | 9/2007 | Harre et al. | |
| 2007/0259981 A1 | | 11/2007 | Eling et al. | |
| 2012/0003890 A1 | | 1/2012 | Schmidt et al. | |
| 2012/0003891 A1 | | 1/2012 | Schmidt et al. | |
| 2013/0045652 A1 | | 2/2013 | Schmidt et al. | |
| 2015/0080530 A1 | | 3/2015 | Hupka et al. | |
| 2017/0037203 A1 | | 2/2017 | Sun et al. | |
| 2019/0169387 A1 | | 6/2019 | Moroiwa et al. | |
| 2019/0225735 A1 | | 7/2019 | Meyer et al. | |
| 2021/0198412 A1 | * | 7/2021 | Eslava | ............... C08G 18/1808 |

FOREIGN PATENT DOCUMENTS

| | | | | |
|---|---|---|---|---|
| CA | 2880729 A1 | * | 2/2014 | ......... C08G 18/3206 |
| EP | 0090444 A2 | | 10/1983 | |
| EP | 0989146 A1 | | 3/2000 | |
| EP | 1460094 A1 | | 9/2004 | |
| JP | H04227642 A | | 8/1992 | |
| JP | H10195171 A | * | 7/1998 | |
| JP | 2004083745 A | | 3/2004 | |

(Continued)

OTHER PUBLICATIONS

Machine translation of WO-2015083795-A1 to Kametani et al. obtained from the European Patent Office website in Sep. 2021 (Year: 2021).*
Machine translation of JP-H10195171-A obtained from the European Patent Office in Jan. 2024 (Year: 2024).*
International Search Report for corresponding PCT/EP2019/053234 dated May 17, 2019, 2 pages.

(Continued)

*Primary Examiner* — Melissa A Rioja
(74) *Attorney, Agent, or Firm* — Armstrong Teasdale LLP

(57) ABSTRACT

The present disclosure relates to processes for the production of a polyurethane material, where (a) di- and/or polyisocyanates, (b) compounds which have hydrogen atoms reactive toward isocyanate groups and which do not include compounds having carbon-carbon double bonds, (c) compounds including at least one carbon-carbon double bond, (d) optionally catalyst that accelerates the urethane reaction, and (e) optionally other auxiliaries and additives are mixed to give a reaction mixture and the mixture is hardened at temperatures above 120° C. The present disclosure further relates to a polyurethane material obtainable by this process, and also to the use of the polyurethane material, in particular of a polyurethane fiber-composite material as structural components.

12 Claims, No Drawings

(56) References Cited

FOREIGN PATENT DOCUMENTS

| JP | 2017193599 A | 10/2017 | | |
|---|---|---|---|---|
| WO | 03031502 A1 | 4/2003 | | |
| WO | 2004029118 A2 | 4/2004 | | |
| WO | 2005012394 A2 | 2/2005 | | |
| WO | 2005090440 A1 | 9/2005 | | |
| WO | 2006034800 A1 | 4/2006 | | |
| WO | 2006042674 A1 | 4/2006 | | |
| WO | 0100684 A1 | 1/2007 | | |
| WO | 2009014689 A2 | 1/2009 | | |
| WO | 2010108701 A1 | 9/2010 | | |
| WO | 2010108723 A1 | 9/2010 | | |
| WO | 2011147688 A1 | 12/2011 | | |
| WO | 2013139704 A1 | 9/2013 | | |
| WO | WO-2015083795 A1 * | 6/2015 | ......... | C08G 18/6208 |
| WO | 2017208605 A1 | 12/2017 | | |
| WO | 2018036943 A1 | 3/2018 | | |

OTHER PUBLICATIONS

Database WPI, Thomson Scientific, retrieved from STN Database accession No. 2017-727609, XP002790856, Oct. 26, 2017, 2 pages.
European Search Report for EP Patent Application No. 18158170.3, dated Aug. 14, 2018, 3 pages.

* cited by examiner

POLYURETHANE-BASED POLYMER MATERIAL HAVING EXCELLENT RESISTANCE TO HEAT DISTORTION AND ELONGATION AT TEAR

CROSS-REFERENCE TO RELATED APPLICATIONS

This application is a U.S. National Phase Application of PCT/EP2019/053234, filed on Feb. 11, 2019, which claims the benefit of priority to European Patent Application Number 18158170.3, filed Feb. 22, 2018, the entire contents of which are hereby incorporated by reference herein.

DESCRIPTION WO2019162115A1

Polyurethane-Based Polymer Material With Excellent Heat Resistance and Elongation at Break Description The present invention relates to processes for the production of a polyurethane material, in which (a) di- and/or polyisocyanates, (b) compounds with hydrogen atoms reactive towards isocyanate groups and containing no compounds with carbon-carbon double bonds, (c) compounds , containing at least one carbon-carbon double bond (d) optionally the catalyst accelerating the urethane reaction and (e) optionally further auxiliaries and additives, mixed to form a reaction mixture and cured at temperatures of greater than 120° C., the Compounds with isocyanate-reactive hydrogen atoms b) have on average at least 1.5 isocyanate-reactive hydrogen groups per molecule and the compounds with carbon-carbon double bond (c) contain compounds (c1) which contain at least one carbon—Carbon double bond and at least one group selected from isocyanate rea active groups or isocyanate groups and/or (c2) which have at least two carbon-carbon double bonds and where the reaction mixture is stabilized to such an extent that the polyurethane material obtained when components (a) to (c) are mixed) and, if available, (d) and (e) at room temperature, injection into a metal mold tempered to 80° C. with the dimensions 20 cm×30 cm×0.4 cm, after 60 minutes demolding and cooling to room temperature, has a heat distortion temperature (three-point bend at 0.45 MPa edge fiber tension according to DIN EN ISO 75), which is at least 15° C. lower than the heat distortion temperature of the identically produced polyurethane material, which after production has been kept for 120 minutes at 150° C. Annealed and then cooled to room temperature.

The present invention further relates to a polyurethane material which can be obtained by such a process, and to the use of the polyurethane material, in particular a polyurethane fiber composite material, as structural components.

Polyurethane materials can be used in many different ways, but are often characterized by their usable properties at high temperatures. Polyurethane fiber composite materials are known and are usually obtained by pultrusion, fiber winding processes or impregnation processes, such as vacuum infusion or RTM. The fiber composite materials obtained in this way are distinguished by a relatively low material weight with high hardness and rigidity, high corrosion resistance and good processability. Polyurethane fiber composite materials are used, for example, as exterior car body parts in vehicle construction, as boat hulls, masts, for example as electricity masts or telegraph masts, or rotor blades for wind turbines.

A current trend is the replacement of metals with plastics, for example as load-bearing parts in construction or as body parts in vehicle construction. Polyurethane-based materials are often suitable. A disadvantage of such polyurethane-based materials is that their temperature resistance is often insufficient in comparison to metals. If supporting metal structures are to be replaced in areas in which a high temperature load can occur, it is necessary that the polyurethane materials can also withstand a high mechanical load even at high temperatures. To this end, attempts are being made to increase the glass transition temperature of the plastic material, polyurethane material, or of the polyurethane fiber composite material. At the same time, these materials should have high impact strength at room temperature, for example to meet the requirements of a crash test. These high temperatures must also exist for the replacement of metals in vehicle construction, for example as exterior parts of the body, particularly during cathodic dip painting, which is common in automobile construction.

Furthermore, polyurethane materials can also be used as adhesives in order to have high temperature resistance for many applications, for example also for adhesive applications in vehicle body construction.

Prepregs are semi-finished textile fiber matrix pre-impregnated with reactive resins that are cured under temperature and pressure to produce components. The matrix is in the partially networked, so-called B state and is pasty to solid and can be hardened. Such prepregs based on polyurethanes are known. These are based on blocked polyisocyanates and are described, for example, in WO1 1147688, WO10108701 and WO10108723. However, this process leads to a relatively high viscosity and thus disadvantages in the impregnation. Furthermore, the use of blocked catalysts requires a very high isocyanate index as described in WO 2013139704. This high excess of isocyanate increases sensitivity to air humidity. Known prepregs are therefore preferably stored in a vacuum bag with the exclusion of air.

The task was therefore to deliver a polyurethane material with increased temperature resistance. It was also an object of the present invention to provide a simple process for improving the mechanical properties of polyurethane at high temperatures and thus to make accessible polyurethanes which can be used as a replacement for metal structures, for example in the cathodic dip coating process or as load-bearing structures . Finally, it was an object of the present invention to provide polyurethane materials which have high mechanical stability at high temperatures and at the same time high impact strength at room temperature. Furthermore, it was the task, in particular for the use of these polyurethane materials in the context of fiber composite materials, to ensure the lowest possible viscosity of the reaction mixture at room temperature, so that the fibers can be impregnated quickly.

Surprisingly, this object is achieved by a process in which (a) di- and/or polyisocyanates, (b) compounds with hydrogen atoms which are reactive toward isocyanate groups and which do not contain any compounds with carbon-carbon double bonds, (c) compounds at least one carbon-carbon double bond, (d) optionally the catalyst accelerating the urethane reaction and (e) optionally further auxiliaries and additives, mixed to form a reaction mixture and cured at temperatures of greater than 120° C., the compounds being compared with Isocyanate-reactive hydrogen atoms b) have on average at least 1.5 isocyanate-reactive hydrogen groups per molecule and the compounds with carbon-carbon double bond (c) contain compounds (c1) which have at least one carbon-carbon double bond and at least one group selected from isocyanate-reactive groups or isocyanate groups and/or (c2) which have at least two carbon-carbon double bonds and the reaction mixture is stabilized to such an extent that the polyurethane material obtained when components (a) to (c) are mixed and, if present, (d) and (e) at room temperature, injection into a metal mold tempered to 80° C. with the dimensions 20 cm×30 cm×0.4 cm, after 60 minutes demolding and cooling to room temperature, a heat resistance temperature (three-point bend at 0.45 MPa Edge fiber tension according to DIN EN ISO 75), which is at least 15° C. lower than the heat distortion temperature of the identically produced polyurethane material, which is tempered for 120 minutes at 150° C. in the oven after production and then cooled to room temperature.

The object of the invention is further achieved by a polyurethane material obtainable by such a method.

Polyurethane in the sense of the invention includes all known polyisocyanate polyaddition products. These include addition products from isocyanate and alcohol as well as modified polyurethanes, which can contain isocyanurate, allophanate, urea, carbodiimide, uretonimine, biuret structures and other isocyanate addition products. These polyurethanes according to the invention include, in particular, solid polyisocyanate polyadducts, such as duromers, and foams based on polyisocyanate polyadducts, in particular rigid polyurethane foams, and polyurethane coatings.

In a further preferred embodiment, the polyurethane is a solid polyurethane with a density of preferably more than 850 g/L, preferably 900 to 1400 g/L and particularly preferably 1000 to 1300 g/L. A solid polyurethane is obtained without the addition of a blowing agent. Small amounts of blowing agent, for example water, which is contained in the polyols for production reasons, is not to be understood as addition of blowing agent in the context of the present invention. The reaction mixture for producing the compact polyurethane preferably contains less than 0.2% by weight, particularly preferably less than 0.1% by weight and in particular less than 0.05% by weight of water. The solid polyurethane preferably contains fillers, in particular fibrous fillers. Suitable fillers are described under (e).

All aliphatic, cycloaliphatic or aromatic isocyanates known for the production of polyurethanes and any mixtures thereof can be used as di- or polyisocyanates (a). Examples are 2.2<'>-, 2.4<'>- and 4.4<'>-diphenylmethane diisocyanate, the mixtures of monomeric diphenylmethane diisocyanates and higher core homologues of diphenylmethane diisocyanate (polymer MDI), isophorone diisocyanate (IPDI) or its oligo—Mere, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI) or mixtures thereof.

Isocyanates based on diphenylmethane diisocyanate, for example 2,4'-MDi, 4,4'-MDI or mixtures of these components, if appropriate also with higher-core homologues of the MDI, are preferably used as di- or polyisocyanates (a). The di- and polyisocyanate (a) preferably has a functionality of 2.0 to 2.9, particularly preferably 2.0 to 2.8. The viscosity of the di- or polyisocyanates (a) at 25° C. according to DIN 53019-1 to 3 is preferably between 5 and 600 mPas and particularly preferably between 10 and 300 mPas. The di- and/or polyisocyanates (a) particularly preferably have at least 50, more preferably 60 to 100 and in particular 70 to 90 mol % of isocyanates with a functionality of 2.

Di- and polyisocyanates (a) can also be used in the form of polyisocyanate prepolymers. These polyisocyanate prepolymers can be obtained by using the above-described polyisocyanate (component (a-1)) in excess, for example at temperatures from 30 to 100° C., preferably at about 80° C., with compounds having at least two groups reactive toward isocyanates (Component (a-2)) to be converted to the prepolymer. The NCO content of polyisocyanate prepolymers according to the invention is preferably from 20 to 33% by weight NCO, particularly preferably from 25 to 30% by weight NCO.

Compounds with at least two groups (a-2) which are reactive toward isocyanates are known to the person skilled in the art and are described, for example, in "Kunststoff Handbuch, 7, Polyurethane", Carl Hanser-Verlag, 3. Edition 1993, chapter 3.1. For example, polyether or polyester films, such as those described below under (b), can be used as compounds having at least two groups reactive toward isocyanates. Preferably used as compounds with at least two isocyanate-reactive groups (a-2) polyether or polyester, containing secondary OH groups, such as polypropylene oxide. The polyether or polyester film preferably has a functionality of 2 to 4, particularly preferably 2 to 3 and a proportion of secondary OH groups of at least 50%, preferably at least 75% and in particular at least 85%.

All compounds known in polyurethane chemistry with hydrogen atoms reactive toward isocyanates, with compounds having carbon-carbon double bonds and a molecular weight of less than 800, can be used as compounds with an average of at least 1.5 hydrogen atoms per molecule (b) which are reactive toward isocyanate groups g/mol are not considered compounds (b), but fall under the definition of compounds (c). Compounds (b) have an average functionality of at least 1.5, preferably 1.7 to 8, particularly preferably 1.9 to 6 and in particular 2 to 4. These include chain extenders and crosslinking agents with an OH functionality of 2 to 6 and a molecular weight of less than 300 g/mol, preferably a functionality of 2 to 4 and particularly preferably 2 to 3, as well as higher molecular weight compounds with opposite Isocyanate-reactive hydrogen atoms and a molecular weight of 300 g/mol and larger.

Chain extenders are molecules with two hydrogen atoms that are reactive toward isocyanate, and molecules with more than two hydrogen atoms that are reactive toward isocyanate are referred to as crosslinkers. These can be used individually or preferably in the form of mixtures. Diamines, diols and/or triols with molecular weights of less than 300 g/mol, particularly preferably from 62 g/mol to less than 300 g/mol and in particular from 62 g/mol to 250 g/mol are preferably used. For example, aliphatic, cycloaliphatic and/or aralphatic or aromatic diamines and diols with 2 to 14, preferably 2 to 10 carbon atoms, such as diethyltoluenediamine (DEDTA), m-phenylenediamines, ethylene glycol, 1,2-propanediol, 2-methyl-1,3-propanediol, 1,3-propanediol, 1,4-butanediol, 1,6-hexanediol, 1,10-decanediol and bis-(2-hydroxyethyl) hydroquinone (HQEE), 1,2-, 1,3-, 1,4-dihydroxycyclohexane, bisphenol-A-bis (hydroxyethyl ether), diethylene glycol, dipropylene glycol, tripropylene glycol, triols, such as 1,2,4-, 1,3,5-trihydroxycyclohexane, glycerol and trimethylolpropan, diethanolamines, triethanolamines, and low molecular weight hydroxyl-containing polyalkylene oxides based on ethylene and/or 1,2-propylene oxide and the aforementioned diols and/or the triols as starter molecules.

Low molecular weight hydroxyl group-containing polyalkylene oxides based on ethylene and/or 1,2-propylene oxide, particularly preferably 1,2 propylene, and trifunctional starters, in particular glycerol and trimethylol propane, are particularly preferably used as crosslinkers. Particularly preferred chain extenders are ethylene glycol, 1,2-propanediol, 1,3-propanediol, 2-methyl-1,3-propanediol, 1,4-butadiol, diethylene glycol, bis- (2-hydroxyoxyethyl) hydroquinone and dipropylene glycol.

If chain extenders and/or crosslinkers are used, the proportion of chain extenders and/or crosslinkers (e) is usually 1 to 50, preferably 2 to 20% by weight, based on the total weight of components (a) to (e).

However, the chain extender or crosslinking agent can also be dispensed with. To modify the mechanical properties, e.g. B. the hardness, the addition of chain extenders, crosslinking agents or optionally mixtures thereof may prove to be advantageous.

Higher molecular compounds with isocyanate-reactive hydrogen atoms preferably have a number average molecular weight of 400 to 15000 g/mol. For example, compounds selected from the group of polyether polyols, polyester polyols or mixtures thereof can be used. Polyetheroies are produced, for example, from epoxides, such as propylene oxide and/or ethylene oxide, or from tetrahydrofuran with hydrogen-active starter compounds, such as aliphatic alcohols, phenols, amines, carboxylic acids, water or compounds based on natural products, such as sucrose, sorbitol or mannitol, using a catalyst . Basic catalysts or double metal cyanide catalysts, such as in PCT/EP2005/010124, EP 90444 or WO 05/090440.

Polyesteroie z. B. prepared from aliphatic or aromatic dicarboxylic acids and polyhydric alcohols, polythioether polyols, polyester amides, hydroxyl-containing polyacetals and/or hydroxyl-containing aliphatic polycarbonates, preferably in the presence of an esterification catalyst. Further possible polyols are, for example, in "Kunststoff Handbuch, Volume 7, Polyurethane", Carl Hanser Verlag, 3. Edition 1993, Chapter 3.1 specified.

The higher molecular weight compounds with isocyanate-reactive hydrogen atoms preferably contain compounds with hydrophobic groups. These are particularly preferably hydroxyl-functionalized compounds with hydrophobic groups. Such hydrophobic groups have hydrocarbon groups with preferably more than 6, particularly preferably more than 8 and less than 100 and in particular more than 10 and less than 50 carbon atoms.

A hydroxyl-functionalized oleochemical compound, a oleochemical polyol, is preferably used as the hydroxyl-functionalized hydrophobic compound. A number of hydroxyl functional oleochemicals are known which can be used. Examples are castor oil, modified with hydroxyl oils such as grapeseed oil, caraway oil black, pumpkin seed oil, borage seed oil, soybean oil, wheat germ oil, rapeseed oil, sunflower oil, peanut oil, apricot kernel oil, pistachio nut oil, almond oil, olive oil, macadamia nut oil, avocado oil, sea buckthorn oil, sesame oil, hazelnut oil, evening primrose oil, wild rose oil , Hemp oil, safflower oil, walnut oil, fatty acid esters modified with hydroxyl groups based on myristoleic acid, palmitoleic acid, oleic acid, vaccenic acid, petroselinic acid, gadoleic acid, erucic acid, nervonic acid, linoleic acid, linolenic acid, stearidonic acid, arachidonic acid, timnodonic acid, clupanodonic acid, The castor oil and its reaction products with alkylene oxides or ketone-formaldehyde resins are preferably used here.

The latter compounds are sold, for example, by Bayer AG under the name Desmophen <®>1 150.

Another group of oleochemical polyols which is preferably used can be obtained by opening the ring of epoxidized fatty acid esters with simultaneous reaction with alcohols and, if appropriate, following further transesterification reactions. The incorporation of hydroxyl groups in oils and fats is mainly carried out by epoxidation of the olefinic double bond contained in these products, followed by the reaction of the epoxy groups formed with a mono- or polyhydric alcohol. The epoxy ring becomes a hydroxyl group or, in the case of polyfunctional alcohols, a structure with a higher number of OH groups. Since oils and fats are mostly glycerol esters, parallel transesterification reactions still take place in the above-mentioned reactions. The compounds thus obtained preferably have a molecular weight in the range between 500 and 1500 g/mol. Such products are offered, for example, by BASF (as Sovermol®) or Altropol Kunststoff GmbH as Neukapol®.

In this process, fat-chemical polyols which contain carbon-carbon double bonds and have a molecular weight of less than 1000 g/mol are assigned to the compounds (c).

The compounds (c) contain at least one carbon-carbon double bond. The compounds (c) further comprise compounds (c1) which have at least one carbon-carbon double bond and at least one group selected from groups which are reactive toward isocyanate or isocyanate groups and/or (c2) the at least two carbon Have carbon double bonds. If compounds (c1) are present which have at least one isocyanate-reactive group and at least one carbon-carbon double bond, these are also taken into account when determining the average functionality of the compounds with isocyanate-reactive hydrogen atoms.

The proportion of the sum of the compounds (c1) and (c2), based on the total amount of compounds (c), is preferably 5 to 100, preferably 8 to 90 and particularly preferably 10 to 80 mol %. The compounds (c1) and (c2) can be used in any ratio to one another. In a particularly preferred embodiment, no compound (c1) is used.

In a preferred embodiment, the compounds (c) have 60 to 100%, preferably 70 to 100% and particularly preferably 90 to 100% of the carbon-carbon double bonds terminal carbon-carbon double bonds.

Typical compounds (c) are, for example, butadiene, isoprene, 1,3-pentadiene, 1,5-hexadiene, 1,7-octadiene, styrene, alpha-methylstyrene, 2-methylstyrene, 3-methylstyrene, 4-methylstyrene, 2,4-Dimethylstyrene, ethylstyrene, isopropylstyrene, butylstyrene, phenylstyrene, cyclohexylstyrene, benzylstyrene and similar derivatives; substituted styrenes such as cyanostyrene, nitrostyrene, N,N-dimethylaminostyrene, acetoxystyrene, methyl 4-vinylbenzoate, phenoxystyrene, p-vinylphenyoxide and similar derivatives and mixtures thereof; Acrylates and substituted acrylates such as acrylonitrile, acrylic acid, methacrylic acid, methacrylic acrylate, 2-hydroxyethyl acrylate, methyl methacrylate, cyclohexyl methacrylate, benyzyl methacrylate, isopropyl methacrylate, octyl methacrylate, methacrylonitrile, ethyl-alpha-ethoxy-acrylate, ethyl-acrylate, ethyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, methyl-acrylate, and, Phenyl acrylate, phenyl methacrylate, acrylamide, N,N-dimethylacrylamide, N-butylacrylamide, methacryloylformamide, hydroxyethyl acrylate, hydroxyethyl methacrylate, hydroxypropyl acrylate, hydroxypropyl methacrylate, hydroxybutyl acrylate, hydroxybutyl methacrylate, and the like derivatives and similar derivatives and the like.

Vinyl esters, vinyl ethers, vinyl ketones, etc., such as vinyl acetate, vinyl butyrate, vinyl formate, vinyl acrylates, vinyl methacrylate, vinyl methoxy acetate, vinyl benzoate, vinyl toluene, vinyl methyl ether, vinyl propyl ether, vinyl butyl ether, vinyl 2-ethylhexyl ether, vinyl phenyl ether, vinyl 2-methyl methoxy ethyl ether, Vinyl ethyl ketone, N-methyl-N-vinyl acetamide, dinvinyl sulfoxide, divinyl sulfone, sodium vinyl sulfonate, methyl vinyl sulfonate, divinyl ether derivatives, such as. B. diethylene glycol divinyl ether or triethylene glycol divinyl ether, trimethylolpropane triallyl ether, trimethylolpropane diallyl ether, glyoxal bis (diallyl acetal) and similar derivatives; Dimethyl fumarate, dimethyl maleate, maleic acid, fumaric acid, dimethylaminoethyl methacrylate, glycidyl acrylate, allyl alcohol, triallyl cyanurate, trivinyl cyanurate, cyanuric acid triallyl ether, 2,4,6-triallyloxy-1,3,5-triazine, 2,4,6-trivinyloxy-1,3,5-triazine, 1,3,5-triacryloylhexahydro-1,3,5-triazine, tris [2-(acryloyloxy)ethyl]isocyanurate, cyanuric acid trivinyl ether, 1,2,4-trivinylcyclohexane, polybutadiene, modified polybutadienes such as hydroxyl-terminated polybutadienes and mixtures thereof, alkylene malonates such as methylene malonate, cyanoacrylic acid vinyl ether; Bisphenol A diacrylate, bisphenol A dimethacrylate, bisphenol A epoxy diacrylate, bisphenol A epoxy dimethacrylate; Pentaerythritol monoacrylate, pentaerythritol, pentaerythritol triacrylate, pentaerythritol, alkoxylated pentaerythritol monoacrylate, alkoxylated pentaerythritol, alkoxylated pentaerythritol, alkoxylated pentaerythritol, glycerol monoacrylate, glycerin, glycerol, alkoxylated glycerol monoacrylate, alkoxylated glycerol, alkoxylated glycerol.

Trimethylolpropane, trimethylolpropane, Trimethylolpropantriacrylat, alkoxylated trimethylolpropane, alkoxylated trimethylolpropane, alkoxylated TrimethylolpropantriacrylatBis-trimethylolpropane, bis-trimethylolpropantriacrylate, bis-trimethylolpropane, bis-trimethylolpropane, butanediol, Tripropylenglykolmonoacrylate, tripropylene, Dipropylenglycoldiacrylate, Dipropylenglykolmonoacrylate, butanediol, butanediol monoacrylate, Triethylenglykoldiactriacrylate, Triethylenglykolmonoacrylate, diethylene glycol diacrylate, diethylene glycol monoacrylate, hexane diol diacrylate, Hexandiolmonoacrylate, pentaerythritol monomethacrylate, pentaerythritol dimethacrylate, pentaerythritol trimethacrylate, pentaerythritol tetramethacrylate, pentaerythritol monomethacrylate alkoxylated, alkoxylated pentaerythritol, alkoxylated pentaerythritol, alkoxylated pentaerythritol, Glycerinmonomet acrylate, glycerol dimethacrylate, glycerol trimethacrylate, alkoxylated glycerol monomethacrylate, alkoxylated glycerol dimethacrylate, alkoxylated glycerol trimethacrylate.

Trimethylolpropane monomethacrylate, trimethylolpropane trimethacrylate, trimethylolpropane monomethacrylate alkoxylated, alkoxylated trimethylolpropane, alkoxylated trimethylolpropane, bis-trimethylolpropantetramethacrylate, bis-trimethylolpropane trimethacrylate, bis-trimethylolpropane pandimethacrylate, bis-trimethylolpropane monomethacrylate, Tripropylenglykoldimethacrylate, dipropylene glycol dimethacrylate, triethylene, diethylene glycol, butyl tandioldimethacrylate, butanediol monomethacrylate, Hexanediol dimethacrylate, hexanediol monomethacrylate. Furthermore, oligomeric reaction products of trimethylolpropane with z. B. acetoacetate or bis (acetoacetates) such. B. described in WO0100684, WO03/031502, WO04/0291 18, WO05012394, WO09014689, Ebecry LEO (amine-modified polyether acrylates) from Allnex.

The double bond functionality of the compound (c) is preferably greater than 1. Preferred ethylenically unsaturated monomers are methyl acrylate, trimethylolpropane triacrylate and hydroxyl-terminated polybutadiene, available under the trade name Krasol, mixtures thereof. E.g. it is possible to use polyfunctional olefins and monofunctional olefins together and thus optimize on the one hand the crosslinking density of the product and on the other hand the viscosity of the starting materials, the monofunctional olefins either being isocyanate-reactive or not.

The proportion of the compounds (c) is preferably 10 to 70% by weight, particularly preferably 25 to 60% by weight and in particular 30 to 50% by weight, in each case based on the total weight of the components (a) to (e). In a preferred embodiment, the double bond density, based on the starting materials and the total weight of components (a) to (e), is preferably more than 0.1% by weight, preferably 1.0 to 30% by weight and in particular 4.0 to 16% by weight. In the context of the present invention, a double bond density is understood to mean the mass fraction of the double bonds in relation to the total mass of components (a) to (e). A mass of 27 g/mol is assumed for a terminal double bond (—CH═CH2; 2 times carbon plus 3 times hydrogen).

In a further embodiment, components c) which do not contain any hydrogen atoms which are reactive toward isocyanates can also be added to the isocanate component.

In a further preferred embodiment, the ratio of isocyanate groups of the di- and polyisocyanates (a) to the number of carbon-carbon double bonds of the compound (c) is 0.1 to 1 to 4 to 1, more preferably 0.4 to 1 to 3 to 1 and in particular 0.5 to 1 to 2 to 1

Conventional polyurethane catalysts can be used as catalysts (d). These greatly accelerate the reaction of the compounds with hydrogen atoms (b) reactive toward isocyanates with the di- and polyisocyanates (a). Examples of customary catalysts which can be used to prepare the polyurethanes are amidines, such as 2,3-dimethyl-3,4,5,6-tetrahydropyrimidine, and tertiary amines, such as triethylamine, tributylamine, dimethylbenzylamine, Dimethylcyclohexylamine, N-methyl-, N-ethyl-, N-cyclohexylmorpholine, N,N,N',N'-tetramethylethylenediamine, N,N,N',N'-tetramethyl-butanediamine, N,N,N',N'-Tetramethyl-hexanediamine, pentamethyl-diethylenetriamine, tetramethyl-diaminoethyl ether, bis (dimethylaminopropyl) urea, dimethylpiperazine, 1,2-dimethylimidazole, 1-azabicyclo (3,3,0) octane, and preferred—Wise 1,4-diaza-bicyclo (2,2,2) octane and alkanolamine compounds, such as triethanolamine, triisopropanolamine, N-methyl- and N-ethyl-diethanolamine and dimethylethanolamine.

Organic metal compounds are also suitable, preferably organic tin compounds, such as tin (II) salts of organic carboxylic acids, eg. B. tin (II) acetate, tin (II) octoate, tin (II) ethylhexoate and tin (II) laurate and the dialkyltin (IV) salts of organic carboxylic acids, e.g. B. dibutyltin diacetate, dibutyltin dilaurate, dibutyltin maleate and dioctyltin diacetate, and bismuth carboxylates such as bismuth (III) neodecanoate, bismuth 2-ethylhexanoate and bismuth octanoate or mixtures thereof. The organic metal compounds can be used alone or preferably in combination with strongly basic amines. If component (b) is an ester, only amine catalysts are preferably used.

Catalysts (d) can be used, for example, in a concentration of 0.001 to 5% by weight, in particular 0.05 to 2% by weight, as a catalyst or Catalyst combination, based on the weight of component (b), are used.

Aids and/or additives (e) can also be used. All auxiliaries and additives known for the production of polyurethanes can be used. Examples include surface-active substances, blowing agents, foam stabilizers, cell regulators, release agents, fillers, dyes, pigments, flame retardants, hydrolysis protection agents, fungistatic and bacteriostatic substances. Such substances are known and are described, for example, in "Kunststoff Handbuch, Volume 7, Polyurethane", Carl Hanser Verlag, 3. Edition 1993, chapters 3.4.4 and 3.4.6 to 3.4.11.

In a further preferred embodiment, the auxiliaries and additives (e) can comprise basic catalysts which are not customary polyurethane-forming catalysts. These include, for example, catalysts that catalyze polyisocyanurate formation. Polyisocyanurate catalysts include alkali metal carboxylates. These preferably include formates and acetates, especially acetates such as sodium acetate and potassium acetate.

In contrast, compounds containing epoxy groups are not necessary for the production of the polyurethane materials according to the invention. The polyurethane material according to the invention preferably contains essentially no compounds containing epoxy groups. This means that the proportion of compounds containing epoxy groups, based on the total weight of components (a) to (e), is preferably less than 1% by weight, particularly preferably less than 0.1% by weight.

In general, the di and/or polyisocyanates (a), the compounds with hydrogen atoms reactive towards isocyanate groups (b) and, if used, further compounds with hydrogen atoms reactive toward isocyanate, such as blowing agents, are used in such amounts in the production of the polyurethane material according to the invention Implemented that the equivalence ratio of NCO groups of the polyisocyanates (a) to the sum of the hydrogen atoms reactive toward isocyanate groups of the further components 0.7 to 1.4, preferably 0.8 to 1.2, is particularly preferred 0.9 to 1.1, and in particular 1.0. A ratio of 1:1 corresponds to an isocyanate index of 100. The curing then takes place at temperatures of greater than 120° C., preferably at 140 to 225° C., particularly preferably at 150 to 210° C. and in particular at 160 to 200° C. The special starting substances (a) to (e) for the production of polyurethanes according to the invention differ only slightly in quantity and quality if an elastomer, a rigid foam or a duromer is to be produced as the polyurethane according to the invention.

For example, no blowing agents are used for the production of solid polyurethanes. Furthermore, the elasticity and hardness of the polyurethane according to the invention can be varied, for example, via the functionality and the chain length of the higher molecular weight compound with at least two reactive hydrogen atoms. Such modifications are known to the person skilled in the art. The starting materials for the production of a solid polyurethane are described, for example, in EP 0989146 or EP 1460094 and the starting materials for the production of a rigid foam in PCT/EP2005/010955. Compound (c) is then added to the starting materials described in these documents.

It is essential to the invention that the reaction mixture is stabilized. A stabilization of the reaction mixture in the sense of the invention is given when the polyurethane material which, when the components are mixed at room temperature and injected into a metal mold heated to 80° C. and having the dimensions 20 cm×30 cm×0.4 cm and after 60 Demold minutes and cooling to room temperature is obtained, a heat resistance temperature in three-point bending at 0.45 MPa edge fiber tension according to DIN EN ISO 75, which is at least 15° C., preferably at least 25° C., more preferably at least 40° C. and in particular—is in particular at least 60° C. lower than the heat distortion temperature of the identically produced polyurethane material, which after annealing is annealed in the oven at 150° C. for 120 minutes and then cooled to room temperature.

This stabilization can be carried out by adding a radical inhibitor. Substances which lead to the radical polymerization of the carbon-carbon double bonds being terminated can be used as radical inhibitors. Radical inhibitors, also known as radical scavengers, include bis (trifluoromethyl) nitroxide, aminoxyl radicals, 2,2-diphenyl-1-picrylhydrazyl and 2,2,6,6-tetramethylpiperidin-1-yloxy. Radical inhibitors used are phenothiazine, nitrobenzene, hydroquinone monomethyl ether, p-benzoquinone and diphenylpicrylhydrazyl. In a preferred embodiment, the reaction mixture contains 0.0001 to 2.0% by weight, preferably 0.0005 to 1.0% by weight and in particular 0.001 to 0.5% by weight of radical inhibitor, based on the Total weight of components (a) to (e). The addition of a radical inhibitor is not always necessary for stabilization. It may also be the case that the reactivity, in particular the reactivity of the compounds having at least one carbon-carbon double bond (c) is so low that addition of the radical inhibitor is not necessary in order to stabilize at 80° C. to effect.

The reaction mixture according to the invention further preferably contains no compounds which initiate a radical reaction. This includes classic radical initiators such as peroxides, e.g. B. dibenzoyl peroxide, disulfides, onium compounds or AIBN and photoinitiators, such as a-hydroxy, a-alkoxy or a-amino-aryl ketones or acylphosphine oxides and photolabile aliphatic azo compounds or Mixtures of the compounds mentioned. This also includes the absence of compounds that could only form during the storage of the reaction components and that could initiate radical reactions. The reaction mixture according to the invention can therefore contain compounds which bring about a decomposition of peroxides, for example organic sulfides, phosphites and phosphonites.

The reaction mixture is preferably prepared in a two-component process. For this purpose, the compounds (b) to (d) and optionally (e) are combined to form a polyol component. The isocyanate component contains isocyanates (a) and optionally (components of component (e). The composition of the polyol component is preferably adjusted so that the viscosity of the polyol component at 25° C. is preferably less than 1000 mPas. The viscosity measurement is based on DIN 53019-1 to 3. The setting of the viscosity can be adjusted in particular by selecting the connection of component (c) and the amount used. The use of acrylates in particular enables the viscosity of the polyol component to be reduced.

In a preferred embodiment, the reaction is carried out as a one-pot reaction after mixing all components a) to e) via a two-stage curing. The reaction mixture is mixed after the mixing of components (a) to (e) for a period of at least 10 minutes, preferably IO to 30 minutes at temperatures of less than 120° C., preferably in the temperature range 30 to 110° C. , more preferably kept at 50 to 80° C. In a second step, the reaction to the polyurethane material according to the invention is continued at a temperature of greater than 120° C., preferably a temperature of greater than 150° C. and in particular a temperature in the range from 160 to 225° C. In the second step, the temperature is usually maintained for at least 2 minutes, preferably 3 to 120 minutes and particularly preferably 10 to 60 minutes. The reaction mixture can also be cooled after the first step, for example to temperatures from −20 to 30° C. At this temperature, the reaction mixture can be stored after completion of the first step and can be stored for several weeks.

In addition to the process according to the invention, a polyurethane, obtainable by a process according to the invention, is also the subject of the invention.

In a preferred embodiment of the present invention, the polyurethane material according to the invention is a polyurethane fiber composite material. To produce it, fibers are wetted with the reaction mixture and then cured to form the polyurethane fiber composite material. Glass fibers, carbon fibers, polyester fibers, natural fibers such as cellulose fibers, aramid fibers, nylon fibers, basalt fibers, boron fibers, zylon fibers (poly (p-phenylene-2,6-benzobisoxazole), silicon carbide fibers, asbestos fibers, metal fibers and combinations thereof. These can be, for example, short or long glass fibers, continuous fibers, laid fabrics, knitted fabrics, knitted fabrics, random fiber mats, and layers with the same or different fiber orientation. Techniques for wetting the fibers are not limited and are well known. These include, for example, the fiber winding process, the pultrusion process, the hand lamination process and the infusion process such as the vacuum infusion process.

The polyurethane materials according to the invention, in particular the polyurethane fiber composite materials according to the invention, show improved heat resistance, an increased glass transition temperature, very good resistance to water and hydrophobic liquids and very good long-term properties. The polyurethane materials according to the invention particularly preferably have a heat resistance in the three-point bend at 0.45 MPa edge fiber tension according to DIN EN ISO 75 of greater than 120° C., more preferably greater than 130° C. and in particular greater than 140° C. and at the same time an impact strength (Charpy) DIN En ISO 179-1/1 fU of over 25 KJ/m<2>.

For example, polyurethane fiber composite materials according to the invention can be used, for example, as adhesives, particularly for areas subject to high thermal stress, structural components, for example exterior parts of bodies in vehicle construction, such as fenders, boat hulls, hot water tanks, for example in the household, as parts of electric motors, masts, for example as Electricity pylons or telegraph poles, insulators and other components in the field of high-voltage technology, rotor blades for wind turbines or as pipes, for example fiber-reinforced pipelines for the oil and gas industry, or Equipment and aids for drilling, extracting and transporting oil and gas. Furthermore, the polyurethane materials according to the invention are suitable for use in cathodic dip coating, which is used in particular in the automotive industry.

In particular in the manufacture of pipes, the use of 25 to 60 parts by weight, particularly preferably 30 to 50 parts by weight, of component (c), in each case based on the total weight of components (a) to (e), in Combination with the use of polyol, containing hydrophobic groups, as compound (b) can also be obtained under tropical climates with temperatures in the range from 25 to 40° C. and a relative humidity of greater than 50% to greater than 90% of polyurethane materials which are essentially free of gas bubbles, have a high media resistance, also to hydrophobic liquids and have a high glass temperature and thus a usability at high temperatures of the medium to be passed through.

Furthermore, the reaction mixture according to the invention can be used in vacuum infusion. For this purpose, 2 to 15% by weight, preferably 3 to 10% by weight, of compounds of component (c), based on the total weight of components (a) to (e), together with higher molecular weight compounds (b), which are a have average functionality of preferably 1.5 to 2.2, more preferably 1.8 to 2.1 and in particular 1.9 to 2.05. If appropriate, component (b) may further contain chain extenders, for example 2 to 30% by weight, based on the total weight of components (a) to (e). Such reaction mixtures are characterized in particular by low shrinkage during curing, good flowability and a long open time.

Furthermore, the reaction mixture according to the invention can be used to produce storage-stable polyurethane prepregs by impregnating fibrous fabrics or scrims at temperatures of preferably less than 100° C., particularly preferably less than 80° C. and in particular less than 50° C. and subsequent curing at temperatures of more than 120° C., preferably 140° C. to 225° C., more preferably 150° C. to 210° C. and in particular 160° C. to 200° C. Prepregs according to the invention are stable in storage at room temperature for a long time and can be quickly cured at temperatures of greater than 120° C. The polyurethane reaction in the B state of the polyurethane prepreg according to the invention (i.e. in the uncured state) is already well advanced and preferably essentially complete. The isocyanate content (NCO content) of the polyurethane prepreg is preferably 0 to 1% by weight. % NCO, particularly preferably 0 to 0.1% by weight NCO. An advantageous property of the prepreg resins is that they go through a B state, in which the resin is only prepolymerized or partially polymerized, is in a hardly sticky state and can be deformed by temperature and possibly pressure before the resin is in its final form fully cured at elevated temperature and strongly cross-linked.

If polyols which have a high equivalent weight, for example greater than 1000 g/mol, are used, sticky intermediates tend to be obtained which can be joined and bonded and are dimensionally stable in the finally cured state. If a tack-free intermediate is desired, this can be achieved by reducing the proportions of the polyols with a high equivalent weight.

The reaction mixtures according to the invention show a low viscosity and thus good impregnability. Due to the low viscosity of the reaction mixture according to the invention at temperatures below 80° C., for example at 10 to 30° C., it is possible to strip off the reaction mixture from the impregnated fiber material and thereby to obtain a high fiber volume fraction. Therefore, an impregnation technique is preferred in which it is possible to efficiently remove excess resin from the fibers and reuse it.

The invention is illustrated below with the aid of examples.

|  | OHN | Ex. 1 | Ex. 2 | Comparative ex. 1 |
|---|---|---|---|---|
| TMPTA |  | 39.9 | 39.9 | 39.9 |
| Polyol 1 | 400 | 15 | 15 | 15 |
| Polyol 2 | 173 | 41.77 | 34.97 | 34.57 |
| Polyol 3 |  |  | 5 | 5 |
| Zeolite |  | 3 | 5 | 5 |
| Catalyst 1 |  | 0.03 | 0.03 | 0.03 |
| Free-radical inhibitor 1 |  |  | 0.1 |  |
| Free-radical initiator 1 |  |  |  | 0.5 |
| Isocyanate 1 |  | 124 | 120.57 | 120.37 |
| Shore D |  | 84 | 84 | 84 |
| Flexural strength | [MPa] | 115.9 | 90.4 | 115.3 |
| Flexural modulus of elasticity | [MPa] | 2413 | 2291 | 2579 |
| Tensile strength | [MPa] | 62.3 | 68 | 65 |
| Tensile modulus of elasticity | [MPa] | 2508 | 2728 | 2685 |
| Elongation at break | [%] | 4.8 | 8 | 6 |
| Impact resistance | [kJ/m$^2$] | 26.3 | 16.47 | 13.76 |
| Heat-deflection temperature HDT B-f (for hardening at up to 170° C.) | [° C.] | 171.7 | 160.4 | 119.4 |
| Heat-deflection temperature HDT B-f (for hardening at 80° C. for one hour and subsequent cooling to room temperature) |  | 53° C. | 51° C. | 49° C. |

Table 1: Manufacture of Thermally Stable Resins

The starting materials (data in all tables in percent by weight. Usual batch size: 300 g polyol component) are mixed at room temperature, then adding the isocyanate and mixing for 60 s in a speed mixer (FA Hauschild), then pouring the reaction mixture into a 20×30×0.4 cm metal mold or 20×30×0.2 cm, wipe off the excess resin with a doctor blade and harden at 80° C. for 1 h, then for 2 h at 120° C. and 2 h at 170° C. The material is then stored at room temperature for 1 week Test specimen milled. The results in Table 1 show that, in the absence of radical starters, a significantly higher heat resistance is found in the examples according to the invention. The heat resistance (three-point bending at 0.45 MPa edge fiber tension according to DIN EN ISO 75) of over 150° C. is remarkable for polyurethane materials. According to this example, the production of fiber-reinforced pipes is possible in particular, for example in the fiber winding process Comparative Example

2:

There will be 99.5 TI. TMPTA and 0.5 TI. Radical starter 1 mixed at room temperature and at 80° C. for 10 min. hardened. An inhomogeneous, brittle polymer with an irregular surface is obtained, from which no test specimens can be removed. The Tg (determined by DSC) is 122° C. The person skilled in the art is aware that the Tg of a polymer is usually above the heat distortion temperature. The comparative example 2 with radically produced homopolymer of the olefin thus has a significantly lower heat resistance than the examples according to the invention.

Table 2

|  | Ex. 2 |
| --- | --- |
| TMPTA | 39.9 |
| Polyol 1 | 15 |
| Polyol 2 | 34.97 |
| Polyol 3 | 5 |
| Zeolite | 5 |
| Catalyst 1 | 0.03 |
| Free-radical inhibitor 1 | 0.1 |
| Isocyanate 1 | 120.57 |
| Heat-deflection temperature HDT B-f [° C.] after hardening at 40° C. for 1 h | <25 |
| Heat-deflection temperature HDT B-f [° C.] after hardening at 40° C. for 1 h, 150° C. for 1 h and 170° C. for 2 h | 160 |

Table 2

The feed materials of Example 2 or Comparative example 1 are mixed at room temperature, adding the isocyanate and mixing for 60 s in a speed mixer (FA Hauschild), then pouring the reaction mixture into a 20×30×0.4 cm metal mold or 20×30×0.2 cm, wipe off the excess resin with a squeegee. The reaction mixture is cured at 40° C. for 1 hour. Then test specimens measuring 4 mm×80 mm×10 mm are punched out for the measurement of the heat resistance.

Some of these test specimens are annealed in accordance with the information in Table 2 and then the heat resistance is measured. The results illustrate the course of the reaction. In the presence of a radical inhibitor, the reaction at temperatures below 80° C. was only partial. The reaction product is storable and sticky in this state. Due to higher temperatures >120° C., the heat resistance of the example according to the invention increases significantly by more than 100° C. and only then reaches the final properties.

The heat resistance of the example according to the invention with complete curing is (160° C.) clearly above the comparison example. 1 with radical starter (120° C.).

Table 3

|  | OHN | Ex. 3 | Ex. 4 |
| --- | --- | --- | --- |
| Polyol 4 |  | 59.6 | 59.6 |
| TMPTA |  | 34.6 | 34.6 |
| Zeolite |  | 5 | 5 |
| Antifoam 1 |  | 0.4 | 0.4 |
| Antifoam 2 |  | 0.4 | 0.4 |
| Catalyst 1 |  | 0.03 |  |
| Polyol 3 |  | 3 | 3 |
| Isocyanate |  | 124 | 120.57 |
| Index |  | 120 | 120 |
| Shore D |  | 83 | 84 |
| 3-point flexural strength | MPa | 131 | 120 |
| Flexural modulus of elasticity | MPa | 2930 | 2770 |
| Tensile strength | MPa | 83 | 85 |
| Elongation at break | [%] | 6 | 8 |
| Tensile modulus of elasticity |  | 3930 | 3180 |
| Charpy | [kJ/m$^2$] | 48.3 | 21.4 |
| HDT B | [° C.] | 160 | 126 |

Table 3: Example 3 (with catalyst) shows better heat resistance and at the same time significantly better impact resistance than Example 4 (without catalysts).

Table 4

|  | OHN | Comparative ex. 3 | Ex. 5 |
| --- | --- | --- | --- |
| TMPTA |  |  | 8 |
| Polyol 4 | 400 | 16 | 15 |
| Polyol 5 | 805 | 20 | 18 |
| Polyol 6 | 400 | 30 | 25 |
| Polyol 7 | 248 | 13.9 | 13.9 |
| Polyol 8 | 160 | 15 | 15 |
| Zeolite |  | 5 | 5 |
| Isocyanate 2 |  | 124 | 116 |
| Shore D |  | 83 | 83 |
| Flexural strength | [MPa] | 115.9 | 112 |
| Flexural modulus of elasticity | [MPa] | 2814 | 2750 |
| Tensile strength | [MPa] | 74 | 76 |
| Tensile modulus of elasticity | [MPa] | 2900 | 2700 |
| Elongation at break | [%] | 9 | 5 |
| Impact resistance | [kJ/m$^2$] | 24.8 | 21.8 |
| Heat-deflection temperature HDT B-f (after hardening at 120° C.) | [° C.] | 68 | 95 |

The Examples in Table 4 show formulations which are particularly suitable for the vacuum infusion process and, because of the lower viscosity of Example 5 according to the invention, allow the component to be filled quickly. A higher heat resistance is found than in the comparative example. 3.

Table 5

|  | OHN | Ex. 6 | Ex. 7 |
|---|---|---|---|
| TMPTA |  | 20 | 30 |
| Polyol 9 | 555 | 77 |  |
| Polyol 5 | 805 |  | 15 |
| Polyol 7 | 248 |  | 15 |
| Polyol 8 | 160 |  | 36.7 |
| Zeolite |  | 3 | 2 |
| Catalyst 1 |  | 0.1 | 0.2 |
| Isocyanate 1 |  | 186 | 136.8 |
| Shore D |  | 83 | 82 |
| Flexural strength | [MPa] | 127 | 114 |
| Flexural modulus of elasticity | [MPa] | 3040 | 2530 |
| Tensile strength | [MPa] | 82 | 64 |
| Tensile modulus of elasticity | [MPa] | 3080 | 2960 |
| Elongation at break | [%] | 5 | 6 |
| Impact resistance | [kJ/m$^2$] | 28 | 21 |
| Heat-deflection temperature HDT B-f (after reaction at 60° C.) | [° C.] | 52° C. | 55° C. |
| Heat-deflection temperature HDT B-f (after hardening at 150° C.) | [° C.] | 98 | 115 |

Table 5: Preparation of Prepreg

Production of a Laminate (Unidirectional Pre-Impregnated Semi-Finished Textile)

The starting materials (Table 5) are mixed at room temperature. The reaction mixture is then continuously filled into an open bath at room temperature using a metering system. The pre-treatment is carried out analogously to the wet winding process. A total of 42 rovings (external take-off, use of thread brakes for each roving) Tex 2400 are first fed through a perforated plate and then continuously through the impregnation bath. The excess resin is separated by means of the wipers integrated in the soaking device and can run back into the bathroom so that no resin drips from the impregnated rovings. The impregnated rovings are then passed through a metallic hole measuring 5.5×0.2 cm, placed between release paper and cured at 80° C. The 5.5 cm wide unidirectional prepreg produced in this way can be wound up on a spool after passing through the heating section.

The prepreg is a non-sticky, solid mass and can be deformed manually without the use of tools. The prepregs produced in this way are unwound and several 30 cm long pieces are cut off. Two layers of prepreg are placed in the mold, fiber orientation 0°, 90°. The mold is then closed and first heated to 120° C. for 1 hour and then to 150° C. for 1 hour. A hard, three-dimensional component that can no longer be manually deformed can then be removed. The fiber volume content is 60%.

Polyol 1: Propoxylated/ethoxylated mixture of sucrose and diethylene glycol, OHZ 400 and a functionality of 4.5, viscosity 3000 mPas [25° C.]

Polyol 2:: branched fatty acid ester, OHZ 173, viscosity 3400 mPas [25° C.] polyol 3: non-NCO reactive fatty acid ester, viscosity 7 mPas [25° C.]

Polyol 4:, propoxylated mixture of sucrose and glycerin, OHZ 490 and a functionality of 4.4, viscosity 8450 mPas [25° C.]

Polyol 5:, propoxylated glycerin OHZ 805, viscosity 1275 mPas [25° C.]

Polyol 6:, propoxylated glycerin, OHZ 400, viscosity 375 mPas [25° C.] Polyol 7:, propoxylated propylene glycol, OHZ 248, viscosity 75 mPas [25° C.]

Polyol 8: castor oil, OHZ 160, viscosity 1025 mPas [25° C.]

Polyol 9: cationically propoxyated glycerol, OHZ 555, viscosity 690 mPas [25° C.]

TMPTA: trimethylolpropane triacrylate catalyst 1: 40% solution of potassium acetate in DPG radical initiator 1: benzoyl peroxide radical inhibitor 1: phenothianzine defoamer 1: Efka SI 2008, BASF SE defoamer 2: Efka SI 2723, BASF SE Isocyanate 1 1:1 mixture of a prepolymer based on 4,4'-MDI, dipropylene glycol/polypropylene glycol and carbodiimide-modified 4,4'-MDI with an NCO content of 26%.

Isocyanate 2: 1:1 mixture of polymer MDI and a 1:1 mixture of 2,4'-MDi and 4,4'-MDI with an NCO content of 32.5%. Tests:

Viscosity according to DIN 53019-1 to 3
Shore hardness test D according to DIN ISO 7619-1
3-Point bending test according to DIN EN ISO 178
Tensile strength according to DIN EN ISO 527
Charpy impact resistance (flatwise) according to DIN En ISO 179-1/1fU
Heat resistance: HDT-B-f, flat three-point bending at 0.45 MPa edge fiber tension according to DIN EN ISO 75

We claim:

1. A process for the production of a polyurethane material with a heat-deflection temperature of at least 130° C. in a three-point bending test with 0.45 MPa outer fiber stress in accordance with DIN EN ISO 75, the process comprising:
   mixing components comprising:
   (a) di- and/or polyisocyanates,
   (b) compounds having hydrogen atoms reactive toward isocyanate groups, where the compounds having hydrogen atoms reactive toward isocyanate groups comprise no compounds having carbon-carbon double bonds,
   (c) compounds comprising at least two carbon-carbon double bonds, wherein the compounds have, based on the at least two carbon-carbon double bonds, 60 to 100% of terminal carbon-carbon double bonds,
   (d) optionally a catalyst that accelerates a urethane reaction, and
   (e) optionally other auxiliaries and additives, to give a reaction mixture, wherein a proportion of the compounds (c) having at least two carbon-carbon double bonds, based on a total weight of components (a) to (e), is 25 to 70% by weight,
   injecting the reaction mixture into a mold, and
   hardening the reaction mixture at temperatures above 120° C., where:
   the compounds b) having hydrogen atoms reactive toward isocyanate groups have, per molecule, an average of at least 1.5 hydrogen groups reactive toward isocyanate and
   where the reaction mixture has been stabilized by addition of a free-radical inhibitor such that when the components are mixed at room temperature and the reaction mixture is injected into a metal mold with dimensions of 20 cm×30 cm×0.4 cm controlled to a temperature of 80° C. and is demolded after 60 minutes and cooled to room temperature, the heat-deflection temperature of the polyurethane material in a three-point bending test with 0.45 MPa outer fiber stress in accordance with DIN EN ISO 75 is at least 25° C. lower than the heat-deflection temperature of polyurethane material which is identically produced except for an additional heat-conditioning step for 120 minutes at 150° C. in an oven before cooling to room temperature;

wherein the process of preparing the polyurethane material does not employ compounds which initiate a radical reaction.

2. The process according to claim 1, wherein an impact resistance of the polyurethane material in accordance with DIN EN ISO 179-1/1fU is above 25 kJ/m².

3. The process according to claim 1, wherein an equivalence ratio of isocyanate groups of the di- and/or polyisocyanates (a) to the hydrogen atoms reactive toward isocyanate is 0.7 to 1.4.

4. The process according to claim 1, wherein a molar mass of the compounds (c) is below 1000 g/mol.

5. The process according to claim 1, wherein the di- and/or polyisocyanates (a) comprise at least 50 mol % of isocyanates with functionality of 2.

6. The process according to claim 1, wherein the di- and/or polyisocyanates (a) comprise 2,4'-MDI, 4,4'-MDI or a mixture of these components, optionally also with MDI homologs having a larger number of rings.

7. The process according to claim 1, wherein the reaction mixture comprises 0.001 to 1.0% by weight of the free-radical inhibitor.

8. The process according to claim 1, wherein the reaction mixture further comprises basic catalysts.

9. The process according to claim 1, wherein the compounds (b) having hydrogen atoms reactive toward isocyanate groups comprising no compounds having carbon-carbon double bonds, comprise higher-molecular-weight compounds having hydrogen atoms reactive toward isocyanate and molar mass of 300 g/mol and above, and the higher-molecular-weight compounds having hydrogen atoms reactive toward isocyanate comprise at least one hydroxy-functional compound having hydrophobic groups.

10. The process according to claim 1, wherein a reaction of the reaction mixture is conducted in a first stage for at least 10 minutes at temperatures below 120° C. and then the reaction mixture is hardened at temperatures above 150° C.

11. A polyurethane material obtainable by a process according to claim 1.

12. A process for the production of a polyurethane material with a heat-deflection temperature of at least 130° C. in a three-point bending test with 0.45 MPa outer fiber stress in accordance with DIN EN ISO 75, the process comprising:

mixing components comprising:
(a) di- and/or polyisocyanates,
(b) compounds having hydrogen atoms reactive toward isocyanate groups, where the compounds having hydrogen atoms reactive toward isocyanate groups comprise no compounds having carbon-carbon double bonds,
(c) compounds comprising at least two carbon-carbon double bonds, wherein the compounds have, based on the at least two carbon-carbon double bonds, 60 to 100% of terminal carbon-carbon double bonds,
(d) optionally a catalyst that accelerates a urethane reaction, and
(e) optionally other auxiliaries and additives, to give a reaction mixture, wherein a proportion of the compounds (c) having at least two carbon-carbon double bonds, based on a total weight of components (a) to (e), is 25 to 70% by weight, and hardening the reaction mixture at temperatures above 120° C., where:
the compounds b) having hydrogen atoms reactive toward isocyanate groups have, per molecule, an average of at least 1.5 hydrogen groups reactive toward isocyanate and where the reaction mixture has been stabilized by addition of a free-radical inhibitor such that when the components are mixed at room temperature and the reaction mixture is injected into a metal mold with dimensions of 20 cm×30 cm×0.4 cm controlled to a temperature of 80° C. and is demolded after 60 minutes and cooled to room temperature, the heat-deflection temperature of the polyurethane material in a three-point bending test with 0.45 MPa outer fiber stress in accordance with DIN EN ISO 75 is at least 25° C. lower than the heat-deflection temperature of polyurethane material which is identically produced except for an additional heat-conditioning step for 120 minutes at 150° C. in an oven before cooling to room temperature;

wherein the polyurethane material is a polyurethane fiber-composite material, where the reaction mixture is used to wet a fiber material and then the reaction mixture is hardened to give the polyurethane fiber-composite material; and wherein the process of preparing the polyurethane material does not employ compounds which initiate a radical reaction.

* * * * *